United States Patent [19]

Ahvenainen et al.

[11] Patent Number: 5,326,835
[45] Date of Patent: Jul. 5, 1994

[54] MULTI-STAGE PROCESS FOR PRODUCING POLYETHYLENE

[75] Inventors: Antero Ahvenainen; Kari Sarantila; Henrik Andtsjö, all of Porvoo; Jouni Takakarhu, Helsinki; Ari Palmroos, Kerava, all of Finland

[73] Assignee: Neste OY, Finland

[21] Appl. No.: 920,569

[22] PCT Filed: Dec. 20, 1991

[86] PCT No.: PCT/FI91/00406
§ 371 Date: Aug. 20, 1992
§ 102(e) Date: Aug. 20, 1992

[87] PCT Pub. No.: WO92/12182
PCT Pub. Date: Jul. 23, 1992

[30] Foreign Application Priority Data

Dec. 28, 1990 [FI] Finland .................. 906428

[51] Int. Cl.$^5$ .................................. C08F 2/06
[52] U.S. Cl. ........................... 526/64; 526/65; 526/348.4; 526/348.6; 526/905
[58] Field of Search .................. 526/65, 64, 905

[56] References Cited

U.S. PATENT DOCUMENTS

| | | | |
|---|---|---|---|
| 3,428,619 | 2/1969 | Hawkins et al. | 260/93.7 |
| 3,622,553 | 11/1971 | Cines | 526/65 |
| 4,309,521 | 1/1982 | Sato et al. | 526/114 |
| 4,368,291 | 1/1983 | Frese et al. | 525/53 |
| 4,538,018 | 8/1985 | Carter | 585/512 |

FOREIGN PATENT DOCUMENTS

| | | |
|---|---|---|
| 1532231 | 11/1978 | United Kingdom . |
| 0057420 | 8/1982 | European Pat. Off. . |
| 8802376 | 4/1988 | PCT Int'l Appl. .......... 526/65 |

*Primary Examiner*—Joseph L. Schofer
*Assistant Examiner*—David Wu
*Attorney, Agent, or Firm*—Steinberg, Raskin & Davidson

[57] ABSTRACT

The invention concerns a multi-stage process for producing polyethylene having a bimodal and/or broad molecular weight distribution in the presence of an ethylene polymerizing catalyst system in a multistep reaction sequence, in which the first reaction step is a liquid phase polymerization step and the second reaction step is formed by one or more gas-phase polymerization steps. According to the process of the invention in the first reaction step ethylene is polymerized in a loop reactor (10) in an inert low-boiling hydrocarbon medium the residence time being at least 10 minutes, reaction mixture is discharged from the loop reactor (10) and at least a substantial part of the inert hydrocarbon mixture is separated and the polymer is transferred into one or more gas-phase reactors (30), where the polymerization is completed in the presence of ethylene and optionally hydrogen and a comonomer. As an inert hydrocarbon medium in the loop reactor (10) propane can be used and the polymerization can be carried out also so that the mixture of inert hydrocarbon, monomer, hydrogen and optional comonomer is under supercritical conditions.

15 Claims, 1 Drawing Sheet

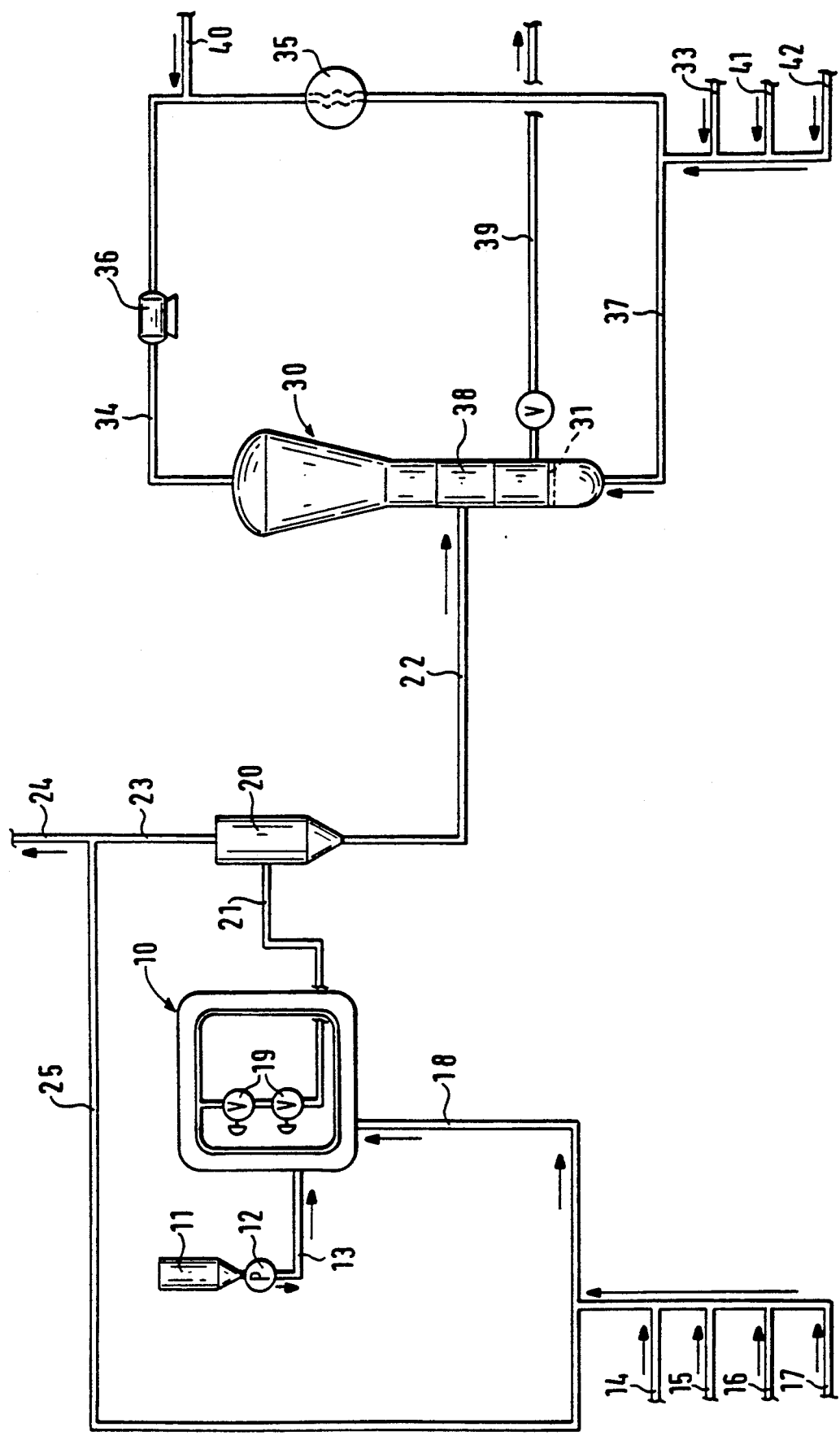

MULTI-STAGE PROCESS FOR PRODUCING POLYETHYLENE

BACKGROUND OF THE INVENTION

The invention relates to a process for producing polyethylene having a bimodal and/or broad molecular weight distribution in a multi-stage process.

In certain applications, where films, bottles, cables and pipes are produced by extrusion or blow moulding, the polyethylenes having a narrow molecular weight distribution are not satisfactory because of their low melt flow properties and poor processability. Therefore different approaches have been suggested for manufacturing polyethylenes having a broad molecular weight distribution.

One approach to widen the molecular weight distribution is to blend a low molecular weight ethylene polymer with a high molecular weight ethylene polymer either mechanically or in solution. However according to this method it is very difficult to achieve sufficient homogeneity and/or expensive equipment is necessary for solution mixing, which makes these methods uneconomical and unpractical.

Attempts have been made to broaden the molecular weight distribution by a proper selection of catalysts. However the degree of broadening the molecular weight by this way is rather small. Also the activity of the catalyst tends to decrease quickly and therefore it is necessary to remove the catalyst residuals by washing.

There are also known various multi-stage processes for broadening the molecular weight distribution by carrying out the polymerization using different hydrogen concentration in each stages. This can be achieved either by polymerizing at a high hydrogen concentration in the first stage and at a low hydrogen concentration in the second phase, or vice versa. In the former case it is necessary to remove the unreacted gases and hydrogen after the first stage. In the latter case the conventional Ziegler-Natta catalysts tend to lose their activity during the progress of polymerization already at the first stage. The rate of polymerization, which is initially high, decreases at the second stage reactor because of the lowered activity of catalyst and high hydrogen concentration. As a consequence the residence time in the second stage becomes much longer than in the first stage. This means larger size of reactor at the second stage and difficulties in the control of the whole process.

Different polymerization methods can be used in multistep processes. Known multistep processes are for example slurry-slurry processes, gas phase-gas-phase processes or slurry-gas phase processes. As examples of slurry-slurry processes can be mentioned U.S. Pat. No. 3,592,880, EP 057 420, EP 237 294, GB 2 020 672, U.S. Pat No. 4,352,915 and EP 057 352. As examples of gas phase-gas phase processes GB 1 505 017, EP 040 992 and U.S. Pat. No. 4,420,592 can be mentioned. As examples of slurry-gas phase processes GB 1 532 231, U.S. Pat. Nos. 4,368,291, 4,309,521, 4,368,304 and EP 283 512 can be mentioned.

The present invention relates to a multi-stage process, in which a slurry-gas phase process is used. Therefore the last mentioned group of patent publications is reviewed here in more detail to clarify the state of the art in this field.

GB 1 532 231 discloses a two-step liquid-gas phase process, where in the first stage an olefine is polymerized in liquid monomer. The liquid phase is partially separated from the polymer and the resulting concentrated mixture is transferred to the gas-phase reactor. Because in the slurry phase according to this publication the polymerization is carried out in liquid monomer, it is evident that this process cannot be used for ethylene polymerization. Another disadvantage in this process is the formation of a solution of low molecular weight polymer in liquid monomer which causes problems related to product stream handling.

U.S. Pat. No. 4,368,291 discloses a two-step liquid-gas phase process, in which an olefine is polymerized in liquid hydrocarbon medium in a stirred tank type reactor. After the first polymerization step the mixture containing polymer particles and liquid hydrocarbon is as a whole transferred to the gas-phase reactor. One disadvantage of this process is that a great amount of hydrocarbon medium used in the first step is transferred to the gas-phase reactor disturbing polymerizing conditions there. The molecular weight control is also difficult in a conventional stirred tank reactor. Separation of heavier diluent is also more difficult and uneconomical.

U.S. Pat. Nos. 4,309,521 and 4,368,304 concern special catalysts, which can be used in liquid-gas-phase processes. These publications do not afford any useful information about the processes as itself.

Lastly EP 283 512 concerns a multi-stage process using certain specified catalyst. According to this publication liquid propylene or other liquid olefine is first prepolymerized in a liquid-phase reactor, for example in a loop reactor, the residence time being from 10 seconds to 400 seconds, after which the polymerization mixture as a whole is transferred to a gas-phase reactor, where polymerization is continued in gas phase. This process is thereby similar to GB 1 532 231 mentioned above and the process cannot be used in ethylene polymerization. The loop reactor step is merely a prepolymerization step. This patent publication is referred to here only because a loop reactor is mentioned in connection with a gas-phase reactor.

SUMMARY OF THE INVENTION

This invention is based on a surprising discovery, that by using a loop reactor polymerization in inert low-boiling hydrocarbon (so-called light diluent process) together with gas-phase polymerization it is possible to achieve special advantages which could not be possible by using conventional slurry-phase polymerization together with gas-phase polymerization.

Accordingly it is an object of the invention to provide a process, which permits manufacturing polyethylene, which has bimodal and/or broad molecular weight distribution and has therefore excellent melt characteristics and extrusion or mold properties. This is because the use of a loop reactor compared to conventional stirred reactors gives better heat transfer from the reaction mixture and therefore more even temperature profile and a higher slurry density and therefore better mixing.

Further the use of loop reactor permits shorter residence times and as a consequence the catalyst does not have time to inactivate considerably and the catalyst transferred to the gas-phase reactor is still very active. The use of a loop reactor also makes possible higher polymer melt flow index, because in a loop reactor higher hydrogen concentrations can be used and therefore it is possible to achieve more narrow molecular weight distribution in the product of slurry phase. A short residence time in combination with the flexibility of a gas phase reactor permits the manufacture of a product with lower density and easier grade changes. Further the use of a loop reactor in combination with one or more gas-phase reactors allows the use of various catalysts and thereby flexibility in selection of catalysts.

These objects are achieved in the multi-stage process according to the invention for producing polyethylene having a bimodal and/or broad molecular weight distribution in the presence of an ethylene polymerizing catalyst system in a multistep reaction sequence, in which the first reaction step is a liquid phase polymerization step and the subsequent reaction steps are one or more gas-phase polymerization steps. According to the invention, in the first reaction step ethylene is polymerized in a loop reactor in an inert hydrocarbon medium with a residence time of at least more than 10 minutes, the reaction mixture is discharged from the loop reactor and at least a substantial part of the inert hydrocarbon medium is separated and the polymer is transferred into one or more gas-phase reactors, where the polymerization is completed in the presence of ethylene monomer and optionally hydrogen and/or comonomers.

Generally any polymerization catalyst suitable for production of ethylene polymers can be used in the process according to the invention. Such catalysts are for example Ziegler-catalysts, which contain a transition metal selected from groups IV, V or VI of the Periodic Table, used together with a cocatalyst, usually an alkyl aluminium compound. Preferable transition metal is titanium and the catalysts may be unsupported or supported on an inorganic carrier such as silica, alumina or silica-alumina and the like.

Preferable catalysts are for example those disclosed in Finnish patent applications 905430, 902123, 901895, 900842, 906323, 905703, 895526, 894266, 893621, 892153 and 872459. However it is to be noted that the process according to the invention is not a catalyst specific process and therefore any catalyst giving appropriate activity and a controllable molecular weight can be used in the process according to the invention.

The first step in the process according to the invention is carried out in a loop reactor, into which inert hydrocarbon medium, ethylene, hydrogen, catalyst and optional comonomer are fed. The loop reactor can be of conventional design, which includes means for feeding various feed components to the reactor, means for circulating the polymer-hydrocarbon suspension through the reactor, heat transfer means for removing heat of polymerization and means for discharging polymer slurry from the reactor.

As a polymerization medium an inert low-boiling hydrocarbon can be used. Examples of the hydrocarbons are aliphatic hydrocarbons, such as propane, butane, pentane, hexane, heptane and octane and alicyclic hydrocarbons such as cyclohexane and cycloheptane. It is also possible to use a mixture of any of the hydrocarbons mentioned above.

The catalyst, preferably as a hydrocarbon slurry and together with a cocatalyst, inert hydrocarbon medium, ethylene, hydrogen and optional comonomer are fed continuously to the loop reactor. The reaction mixture is continuously circulated through the reactor, whereby a slurry of particle form polyethylene and inert hydrocarbon is formed. The loop reactor conditions are selected so that at least 20%, but preferably 40-90% of the total production is polymerized in the loop reactor.

The temperature is usually selected between 75°-110° C., preferably between 85°-100° C. Higher temperatures can also be used provided that the temperature remains below the melting point of the polymer under the prevailing reactor conditions. The reactor pressure can be selected between 40-90 bar, preferably between 50-65 bar. The residence time should be at least 10 minutes, but preferably between 1-2 hours. The molar ratio of hydrogen to ethylene is selected depending among others on the melt index of the product desired, but in the manufacture of bimodal polyethylene it will be between 0-1.0.

Special advantages can be achieved if a hydrocarbon, preferably propane, under supercritical condition is used as inert hydrocarbon medium. This means that the reaction is carried out in such conditions, in which the temperature and the pressure are above the corresponding critical points of the reaction mixture formed by ethylene, propane, hydrogen and optional comonomer, but the temperature is lower than the melting point of the polymer formed. Thereby the temperature in the loop reactor will be between 85°-110° C. and the pressure between 60-90 bar.

By using supercritical propane phase it is possible to use higher hydrogen concentrations than would be possible in subcritical conditions or by using isobutane or other hydrocarbons. The product has lower solubility and the separation of the hydrocarbon (propane) and hydrogen by flashing technique is easier. In supercritical conditions there is in the reactor practically one single reaction fluid, where no separate liquid and gas phases can be detected, and this gives good heat transfer, free mixing of gas components in the fluid and a low viscosity of the reaction medium.

The reaction mixture is removed from the loop reactor either continuously or intermittently by conventional means. The inert hydrocarbon mixture as well as comonomer and hydrogen, if present, is removed from the polymer particles by conventional means, for example by flashing technique. The hydrocarbon medium, remaining monomers and hydrogen can be recycled back to the loop reactor.

The concentrated polymer mixture is then fed to a gas-phase reactor. This reactor can be a conventional fluidized-bed reactor, although other types of gas-phase reactors can also be used. In the fluid-bed reactor the bed comprises formed and growing polymer particles as well as catalyst components. The bed is kept in fluidized state by introducing gaseous components, such as ethylene monomer at a velocity sufficient to cause the particles to act as a fluid. The fluidizing gas can include also inert carrier gases, such as nitrogen and also hydrogen, if desired as a modifying component.

The gas-phase reactor used in the second phase can be operated at a temperature range of 60°-115° C., preferably 70°-110° C. The pressure can be within the range of 10-25 bar the partial pressure of ethylene being 1-20 bar. The molar ratio of hydrogen to ethylene is preferentially lower than in the loop reactor. Thereby the hydrogen concentration in the gas-phase reactor can be between 0-10 mol-%.

It is also possible to feed various gaseous comonomers to the gas-phase reactor, if desired. These comonomers include for example propylene, 1-butene, pentene, 1-hexene, 1-octene or 4-methyl-1-pentene.

It is also preferable to use a gas-phase reactor, which is equipped with a mixer. It helps to keep the reactor surfaces clean and improves gas distribution into the reactor.

The invention is not limited to a two-stage process. Instead of one gas-phase reactor it is possible to use two or even three gas-phase reactors after the loop reactor.

BRIEF DESCRIPTION OF THE DRAWINGS

The configuration of the process according to the invention is further illustrated by the FIGURE enclosed, in which a loop reactor is marked by reference number 10. The catalyst is fed from a catalyst reservoir 11 with the aid of a catalyst feeder 12 through the catalyst transfer line 13 to the loop reactor 10. Ethylene from line 14, low-boiling hydrocarbon from line 15, hydrogen from line 16 and optional comonomer from line 17 are fed to the loop reactor 10 through line 18. In the loop reactor 10 the reaction mixture is circulated by proper circulation means (not disclosed) and at the same time polymerization heat is removed by cooling the reactor or the reaction medium with a cooling system (not disclosed).

From the loop reactor 10 the polymer-hydrocarbon mixture is fed to a flash separator 20, through one or more discharge valves 19 and a product discharge line 21. The hydrocarbon medium, remaining monomer and comonomer and hydrogen separated from the polymer particles are removed from the flash separator 20 through line 23 either to the diluent recovery system (not disclosed) through line 24 or recycled back to the loop reactor 10 through line 25. The polymer particles are removed from the flash separator through line 22 to the gas-phase reactor 30.

In the lower part of the gas-phase reactor 30 there is a bed of polymer particles, which is kept in fluidized state by blowing gaseous monomer, comonomer and hydrogen via line 37 to the bottom of the reactor 30 and through the gas distribution plate 31. Gaseous components are continuously removed from the top of the reactor 30 via line 34 and recycled through a compressor 36, a cooling device 35, and line 37 back to the bottom of the reactor 30. Ethylene from line 33, comonomer from line 40, nitrogen from line 41 and hydrogen from line 42 can also be fed into the reactor 30. The reactor can be equipped with a mechanical stirrer 38 in order to keep the reactor surfaces clean and to improve the gas distribution. The product is removed intermittently or continuously from the gas-phase reactor 30 through line 39 to the product recovery system (not disclosed).

Although only one gas-phase reactor has been illustrated in the FIGURE, it is evident that it is possible to use two or even three gas-phase reactors in the process according to the invention as long as the first polymerization step is carried out in a loop reactor according to the claims.

DESCRIPTION OF PREFERRED EMBODIMENTS

The invention is further illustrated by the following examples.

EXAMPLES 1-8

In a two-phase polymerization of ethylene a pilot-scale loop reactor having a capacity of about 50 kg/h and a gas-phase reactor having a capacity of about 75 kg/h including also the product coming from the loop reactor was used. In addition to ethylene 1-butene as a comonomer in the loop reactor and 1-butene and 1-hexene in the gas-phase reactor was used. Hydrogen was used as a modifier. The catalyst added to the loop reactor was prepared according to example 1 in PCT-application FI90/00279. Propane and isobutane were used as a reaction medium in the loop reactor.

The gaseous components from the product coming from the loop reactor were removed into a flash tank, after which the product was transferred to the gas-phase reactor, where the polymerization was continued. Only loop reactor polymerization was studied in examples 2, 3, 7 and 8. The polymerization conditions and the product properties are disclosed in the following table.

TABLE

| Example | 1 | 2 | 3 | 4 | 5 | 6 | 7 | 8 |
|---|---|---|---|---|---|---|---|---|
| Loop Reactor | | | | | | | | |
| Hydrocarbon | $C_3$ | $iC_4$ | $C_3$ | $C_3$ | $C_3$ | $iC_4$ | $iC_4$ | $iC_4$ |
| Production rate (kg/h) | 24 | 17 | 14 | 20 | 22 | 30 | 18 | 20 |
| Catalyst feed (g/h) | 12 | 2 | 8 | 15 | 4 | 5 | 20 | 8 |
| Catalyst activity (kg/gcat) | 2.0 | 8.5 | 1.8 | 1.3 | 5.4 | 6.0 | 0.9 | 2.5 |
| Temperature (°C.) | 95 | 95 | 85 | 85 | 75 | 95 | 92 | 91 |
| Critical temperature (°C.) | 85 | | | | | | | |
| Pressure (bar) | 65 | 47 | 65 | 65 | 65 | 50 | | |
| Critical pressure (bar) | 50 | | | | | | | |
| Ethylene concentration (mol-%) | 7.6 | 8.7 | 7.8 | 6.8 | 7.1 | 8.5 | | |
| Hydrogen concentration (mol-%) | 1.9 | 1.0 | 1.2 | 0.7 | 1.5 | 1.8 | | |
| 1-Butene concentration (mol-%) | 0.0 | 0.0 | 7.6 | 7.5 | 11.7 | 0.0 | | |
| Residence time (h) | 0.5 | 1.2 | 1.7 | 1.1 | 1.0 | 1.3 | | |
| Product density (kg/m$^3$) | 978 | 967 | 944 | 929 | 943 | 971 | 936 | 935 |
| Melt flow index MFR$_2$ | 96 | 8 | 260 | 150 | 148 | 140 | 1.7 | 0.2 |
| D($M_w/M_n$) | | 3.5 | | 4.0 | | | | |
| Gas-phase reactor | | | | | | | | |
| Production rate (kg/h) | 25 | | | 10 | 29 | 27 | | |
| Temperature (°C.) | 85 | | | 75 | 75 | 85 | | |
| Pressure (bar) | 20 | | | 20 | 20 | 20 | | |
| Ethylene concentration (mol-%) | 10 | | | 15 | 31 | 10 | | |
| Hydrogen concentration (mol-%) | 0.8 | | | 3.0 | 8.1 | 0.1 | | |
| 1-Butene concentration (mol-%) | 0.8 | | | 3.8 | 7.8 | 0.0 | | |
| 1-Hexene concentration (mol-%) | 0.0 | | | 0.0 | 0.0 | 0.9 | | |
| Residence time (h) | 3.7 | | | 5.4 | 6.8 | 2.5 | | |
| End Product | | | | | | | | |
| Production rate (kg/h) | 49 | | | 30 | 51 | 57 | | |
| Catalyst activity (kg/gcat) | 4.0 | | | | 12.5 | 11.4 | | |
| Product density (kg/m$^3$) | 948 | | | 929 | 928 | 955 | | |

TABLE-continued

| Example | 1 | 2 | 3 | 4 | 5 | 6 | 7 | 8 |
|---|---|---|---|---|---|---|---|---|
| Melt flow $MFR_2$ | | | | | | | | |
| Melt flow $MFR_5$ | 0.6 | | | 0.7 | 0.8 | 0.8 | | |
| $D(M_w/M_n)$ | 12 | | | 9 | | 23 | | |
| Pipe pressure test | | | | | | | | |
| 5.3 MPa | | | | | | >3200→ | | |
| 4.6 MPa | | | | | | >3200→ | | |

D = molecule weight distribution $(M_w/M_n)$
$C_3$ = propane
$iC_4$ = isobutane
MFR = melt flow rate With the process according to the invention it is possible to manufacture bimodal products having a controllable molecular weight distribution D $(M_w/M_n)$. In the examples 1, 4 and 6 the molecular weight distributions D of the products were 12, 9 and 23. According to the invention even wider ranges can be achieved. In normal unimodal products the corresponding D-values when Ziegler-type catalysts are used, are usually 3,5–6. In the process according to the invention the loop reactor produces products having a narrow molecular weight distribution. The D-values 3.5–4.0 measured in examples 2 and 4 are typical values.

From the products manufactured in examples 5 and 6 pipes were extruded the processability being good. The pipes of example 6 were pressure tested by keeping the pipes in pressures of 5.3 and 4.6 MPa over 3200 hours (the tests still continuing), which shows good pipe strength. It is not possible to manufacture pipes having comparable properties from unimodal polyethylene.

The loop reactor process makes it possible to use high hydrogen concentration, especially when supercritical propane is used as diluent. As observed when the examples 1, 5 and 6 were carried out, no formation of gas bubbles was detected. Melt flow index $MFR_2$ can be even as high as 260 without any problems (Example 3).

With loop reactor it is possible to produce products having low density when supercritical propane is used as a diluent. The critical temperature of propane alone is about 92° C. and the critical pressure is about 45 bar (g). In the conditions of Example 1 the critical temperature was about 85° C. and the critical pressure about 50 bar (g), which means supercritical conditions. When other hydrocarbons are used as reaction medium, the solubility prevents the achieving of a density below about 945 kg/m³ (hexane diluent) or below about 935 kg/m³ (isobutane diluent). According to example 4 it is possible to achieve a density of 929 kg/m³ the melt flow being very high ($MFR_2=150$) without plugging of the reactor. When the example 7 was carried out it was observed that by using isobutane as diluent the reactor plugged, the density being 936 kg/m³ and the melt flow index $MFR_2$ being 1.7. Wherein isobutane was used as the diluent, it was possible to achieve a density of 935 kg/m³ melt flow index $MFR_2$ being lower (0.2), as example 8 shows.

We claim:

1. A multi-stage process for producing polyethylene having a bimodal and/or broad molecular weight distribution in a multi-step reaction sequence, in which the first stage is a liquid phase polymerization step and the second step comprises one or more gas phase polymerization steps, said process comprising polymerizing ethylene in the first step in the presence of an ethylene polymerizing catalyst system, hydrogen and optional comonomer in a loop reactor in an inert low boiling hydrocarbon medium during a residence time which is at least 10 minutes and which is sufficiently long to produce polyethylene in an amount of 20–90% based on the total polymer produced in the process, discharging the resulting reaction mixture from the loop reactor, removing hydrogen, unreacted reactants, and the inert hydrocarbon medium from said reaction mixture, transferring the produced polymer from which hydrogen, unreacted reactants and the hydrocarbon medium has been removed into one or more gas phase reactors, and completing the polymerization in the gas phase reactor in the presence of ethylene and optionally hydrogen and comonomer to produce polyethylene having bimodal and/or broad molecular weight distribution.

2. Method according to claim 1, wherein the polymer produced in the first step has a higher melt flow index, and the polymer produced in the second step has a lower melt flow index and lower density.

3. Method according to claim 1, wherein the ratio of hydrogen to ethylene in the first step is up to 1 mol/mol.

4. Method according to claim 1, wherein the inert hydrocarbon medium is propane, butane, pentane, hexane, heptane, octane, cyclohexane or cycloheptane.

5. Method according to claim 1, wherein the inert hydrocarbon medium is propane or isobutane.

6. Method according to claim 1, wherein the inert hydrocarbon medium is propane.

7. Method according to claim 1, wherein the first step polymerization is carried out at a temperature of about 75°–110° C. and a pressure of 40–90 bar.

8. Method according to claim 1, wherein the residence time in the first step is between about 1–2 hours.

9. Method according to claim 1, wherein hydrogen and the inert hydrocarbon medium is removed by flashing.

10. Method according to claim 1, wherein the polyethylene produced in the first step is 40–90% based on the total polymer produced in the process.

11. Method according to claim 7, wherein the low boiling hydrocarbon medium in the first step is propane or butane.

12. A multi-stage process for producing polyethylene having a bimodal and/or broad molecular weight distribution in a multi-step reaction sequence, in which the first step is a liquid phase polymerization step and the second step comprises one or more gas phase polymerization steps, said process comprising polymerizing ethylene in the first step in the presence of an ethylene polymerizing catalyst system, hydrogen and optionally comonomer in a loop reactor in propane medium under supercritical conditions wherein the polymerization temperature and pressure are above the corresponding critical points of the mixture formed by propane, ethylene, hydrogen and optional comonomer and below the melting point of formed polymer, during a residence time of at least 10 minutes and sufficiently long to produce polyethylene in an amount of 20-90% based on the total polymer produced in the process, discharging the resulting reaction mixture from the loop reactor, removing hydrogen, unreacted reactants and the propane from the reaction mixture, transferring the polymer from which hydrogen, unreacted reactants and the propane have been removed into one or more gas phase reactors, and completing the polymerization in the gas phase reactor in the presence of ethylene and optionally hydrogen and comonomer to produce polyethylene having bimodal and/or broad molecular weight distribution.

13. Method according to claim 12, wherein the polymerization in the loop reactor is carried out at a temperature of about 85°-110° C. and a pressure of 60-90 bar.

14. Method according to claim 12, wherein hydrogen, unreacted reactants and the propane are removed by flashing.

15. Method according to claim 12, wherein the polyethylene produced in the first step is 40-90% of the total polymer produced in the process.

* * * * *